United States Patent
Chu

(10) Patent No.: US 8,858,209 B2
(45) Date of Patent: Oct. 14, 2014

(54) POSITIONING DEVICE FOR RUNNER SYSTEM

(71) Applicant: Hon Hai Precision Industry Co., Ltd., New Taipei (TW)

(72) Inventor: Chih-Hao Chu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/953,925

(22) Filed: Jul. 30, 2013

(65) Prior Publication Data

US 2014/0205698 A1  Jul. 24, 2014

(30) Foreign Application Priority Data

Jan. 18, 2013  (TW) ................................. 102102114

(51) Int. Cl.
  *B29C 45/80* (2006.01)
  *B29C 45/27* (2006.01)

(52) U.S. Cl.
  CPC ......... *B29C 45/80* (2013.01); *B29C 2045/2719* (2013.01); *B29C 2045/2717* (2013.01); *B29C 45/2725* (2013.01); *B29C 45/2756* (2013.01)
  USPC ............................ 425/150; 425/570; 425/572

(58) Field of Classification Search
  CPC  B29C 45/80; B29C 45/2725; B29C 45/2756; B29C 2045/27; B29C 2045/2701; B29C 2045/2717; B29C 2045/2719; B29C 2045/2725
  USPC .......................................... 425/150, 570, 572
  See application file for complete search history.

(56) References Cited

U.S. PATENT DOCUMENTS

| | | | | |
|---|---|---|---|---|
| 5,269,677 | A | * | 12/1993 | Gauler .......................... 425/568 |
| 5,853,776 | A | * | 12/1998 | Meijer .......................... 425/570 |
| 6,099,292 | A | * | 8/2000 | McGrevy ...................... 425/547 |
| 6,824,380 | B2 | * | 11/2004 | Lee ............................... 425/572 |
| 7,018,199 | B2 | * | 3/2006 | Tooman ........................ 425/572 |
| 7,418,775 | B2 | * | 9/2008 | Tooman ........................ 29/558 |
| 7,481,644 | B2 | * | 1/2009 | Chen ........................ 425/192 R |
| 8,142,183 | B2 | * | 3/2012 | Jenko ........................... 425/549 |
| 2003/0098140 | A1 | * | 5/2003 | Yu ................................ 164/113 |
| 2006/0083811 | A1 | * | 4/2006 | Fairy et al. .................... 425/568 |
| 2006/0228442 | A1 | * | 10/2006 | Fischer et al. ................ 425/572 |
| 2006/0261521 | A1 | * | 11/2006 | Beaumont ................ 264/328.12 |
| 2006/0263469 | A1 | * | 11/2006 | Feick ............................. 425/572 |
| 2006/0286197 | A1 | * | 12/2006 | Manda et al. ................. 425/572 |
| 2007/0071846 | A1 | * | 3/2007 | Xue et al. ...................... 425/572 |
| 2007/0104825 | A1 | * | 5/2007 | Tsai ............................. 425/572 |
| 2007/0172537 | A1 | * | 7/2007 | Guenther ...................... 425/567 |
| 2007/0218158 | A1 | * | 9/2007 | Chen ............................. 425/190 |
| 2008/0029932 | A1 | * | 2/2008 | Zietlow et al. ................ 264/319 |
| 2009/0186117 | A1 | * | 7/2009 | Belzile et al. ................. 425/572 |
| 2009/0191301 | A1 | * | 7/2009 | Baumann ...................... 425/549 |
| 2013/0224508 | A1 | * | 8/2013 | Todesco et al. ............... 428/523 |

* cited by examiner

*Primary Examiner* — Yogendra Gupta
*Assistant Examiner* — Emmanuel S Luk
(74) *Attorney, Agent, or Firm* — Novak Druce Connolly Bove + Quigg LLP

(57) ABSTRACT

A positioning device is configured for positioning a runner system, and includes a retainer, a number of flanges, and a number of bearing assemblies. The retainer includes a supporting surface. The flanges extend substantially perpendicularly upward from the supporting surface. The flanges cooperatively define a cavity for receiving the runner system. The bearing assemblies are configured for inserting through the flanges to tightly abut against the runner system in the cavity.

13 Claims, 2 Drawing Sheets

POSITIONING DEVICE FOR RUNNER SYSTEM

BACKGROUND

1. Technical Field

The present disclosure relates to positioning devices, and particularly to a positioning device for a runner system.

2. Description of Related Art

After an injection molding product, such as a lens, is molded on a runner system, the runner system is positioned in a retainer of a shearing machine for shearing the molded lens. However, the runner system is not positioned securely and can be moved out of place. As a result, cutting edges made on the lens may not be precise enough to satisfy precision requirements of the lens.

Therefore, it is desirable to provide a positioning device that can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
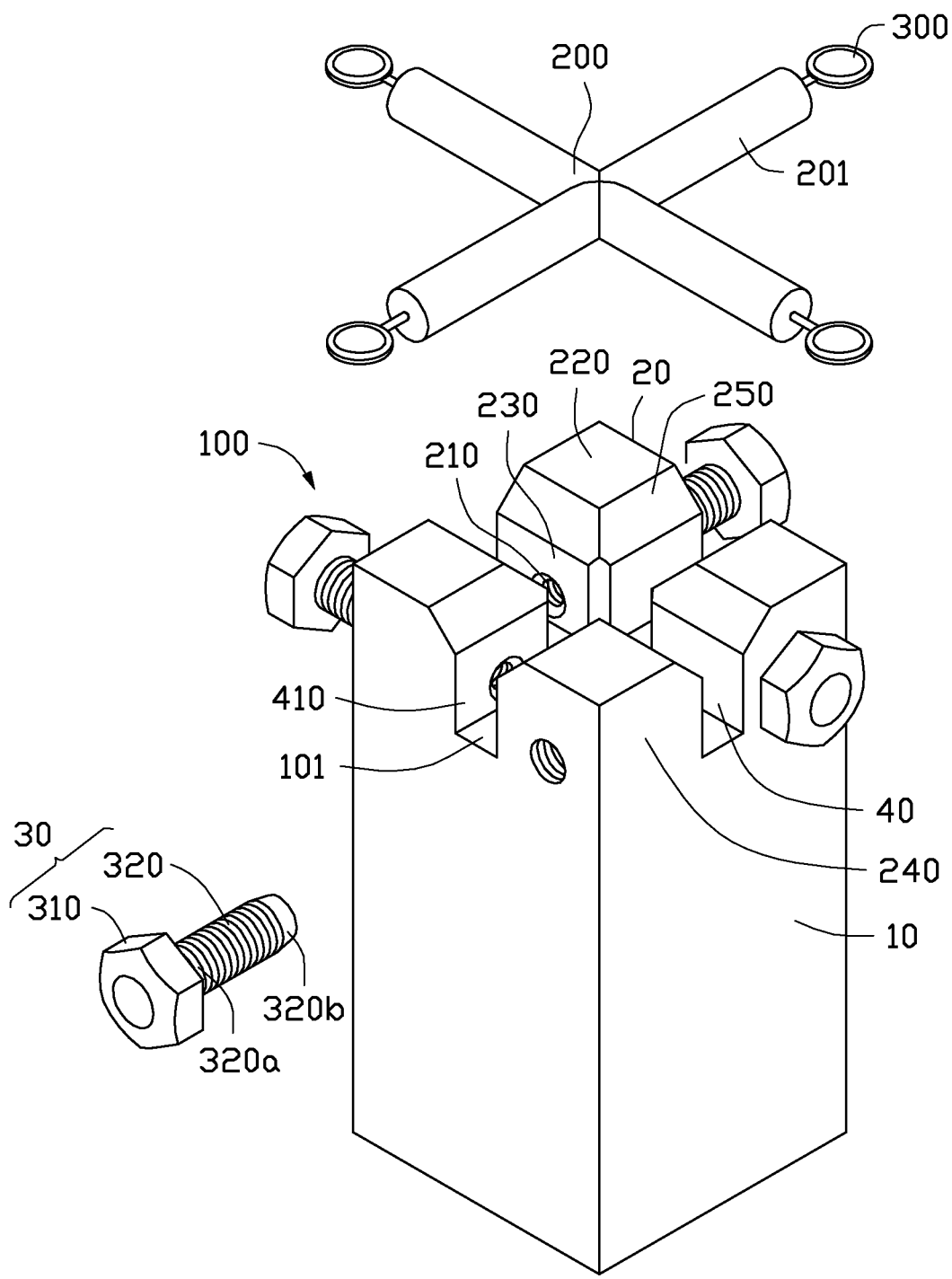
FIG. 1 is an exploded, isometric view of a positioning device together with a runner system, according to an exemplary embodiment.
Figure 2:
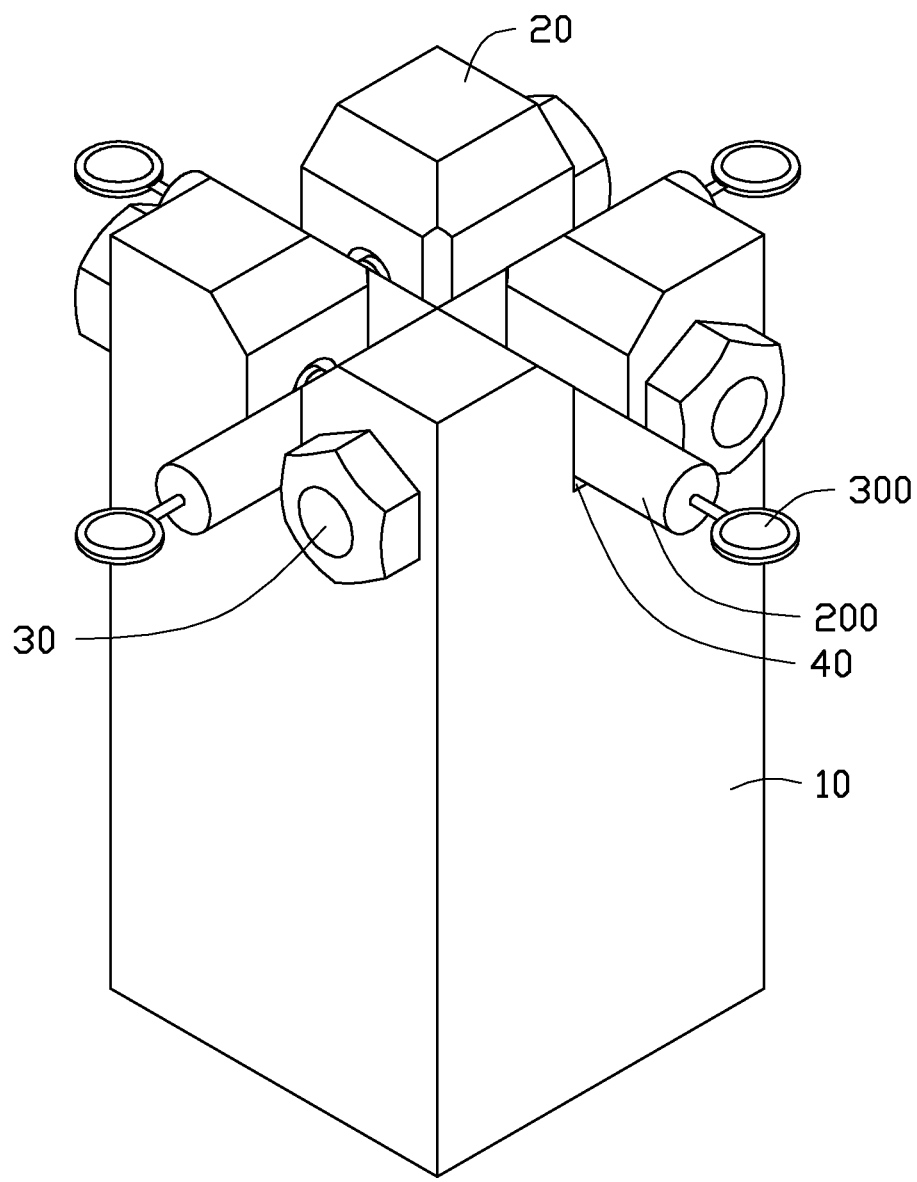
FIG. 2 is an assembled, isometric view of the positioning device of FIG. 1, together with the runner system.

FIGS. 1-2 show a positioning device 100 for positioning a runner system 200. The runner system 200 is cross-shaped and includes four branch members 201 positioned equidistantly around the runner system 200. Four lenses 300 are respectively attached to the four branch member 201 by a connecting portion of each of the branch members 201.

The positioning device 100 includes a retainer 10, a number of flanges 20, and a number of bearing assemblies 30.

The retainer 10 is substantially cuboid and includes a substantially rectangular supporting surface 101.

In the embodiment, the four flanges 20 extend substantially perpendicularly upward from the supporting surface 101. The four flanges 20 are integrally formed with the retainer 10. Alternatively, the four flanges 20 and the retainer 10 can be separately formed. The four flanges 20 can be attached to the retainer 10 by an adhesive, by welding methods (e.g., plastic welding), or by other attaching methods. All of the flanges 20 are substantially identical in height. The four flanges 20 are respectively located at four corners of the supporting surface 101.

In the embodiment, both the number of the bearing assemblies 30 and the number of the flanges 20 all correspond to the number of the branch members 201. Such the runner system 200 includes four branch members 201 that both the numbers of the flanges 20 and the bearing assembly 30 each are four.

In the embodiment, the four flanges 20 cooperatively define a cavity 40. A shape of the cavity 40 corresponds to a shape of the runner system 200. Every two adjacent flanges 20 cooperatively define a receiving channel 410. As such, the retainer 10 defines four receiving channels 410. The four receiving channels 410 communicate with each other and cooperatively define the cross-shaped cavity 40.

Each flange 20 defines a threaded hole 210. The threaded hole 210 forms internal threads on an internal wall of the threaded hole 210. In the embodiment, the bearing assemblies 30 are bolts. Each bearing assembly 30 includes a screw cap 310 and a screw bar 320. The screw bar 320 includes a first end 320a and a second end 320b away from the first end 320a. The first end 320a is fixedly connected to the screw cap 310. The screw bar 320 forms external threads on an external surface of the screw bar 320. The external threads correspond to the internal threads of the threaded holes 210. A diameter of the screw bar 320 is substantially equal to a diameter of the threaded hole 210, and a length of the screw bar 320 is slightly longer than a length of the threaded hole 210. As such, the screw bars 320 engage with the threaded holes 210, and the second ends 320b abut against the branch members 201.

An axis of the threaded hole 210 is substantially perpendicular to a lengthwise direction of a corresponding receiving channel 410 directly communicating with the threaded hole 210. As such, each of the screw bars 320 engages with one of the threaded holes 210, and fixedly positions a corresponding branch member 201 in the corresponding receiving channel 410.

Each flange 20 includes a top surface 220, two internal sidewalls 230, and two outer sidewalls 240. Each internal sidewall 230 faces a flange 20. Each flange 20 defines two sloped surfaces 250. Each sloped surface 250 extends from the top surface 220 to a corresponding internal sidewall 230 to enlarge an opening formed by two adjacent flanges 20. The sloped surfaces 250 form an angle with the corresponding top surface 220. In this embodiment, the angle is about 30 degrees. The sloped surfaces 250 are configured to guide the branch members 201 into the receiving channels 410. This is convenient for putting the runner system 200 in the cavity 40.

In use, firstly, the runner system 200 is placed in the cavity 40, such that every receiving channel 410 receives one of the branch members 201. Then, the screw bars 320 are engaged with the corresponding threaded holes 210, such that the second ends 320b tightly abut against the branch members 201. Finally, the lenses 300 are cut by a cutting machine (not shown). Because the branch member 201 are fixedly received in the receiving channels 410, the branch members 201 are precisely positioned in the receiving channels 410, such that cutting edges made on the lenses 300 satisfy precision requirements of the lenses 300.

It is noteworthy that in alternative embodiments, the number of the flanges 20 can be set according to the shape of the runner system 200, and the number of bearing assemblies 30 and the number of threaded holes 210 can be set accordingly.

It is noteworthy that, in alternative embodiments, the screw caps 310 can be omitted if the bearing assemblies 30 can effectively fix the branch members 201 without them.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A positioning device for positioning a runner system, the positioning device comprising:
   a retainer comprising a supporting surface;
   a plurality of flanges extending substantially perpendicularly upward from the supporting surface, the flanges cooperatively defining a cavity for receiving the runner system; and a plurality of bearing assemblies, each of the bearing assemblies configured for running through a respective one of the flanges to tightly abut against the runner system in the cavity.

2. The positioning device of claim 1, wherein the flanges are integrally formed with the retainer.

3. The positioning device of claim 1, wherein the four flanges are attached to the retainer.

4. The positioning device of claim 1, wherein all of the flanges are substantially identical in height.

5. The positioning device of claim 1, wherein the retainer is substantially cuboid, the plurality of flanges comprises four flanges respectively located at four corners of the supporting surface.

6. The positioning device of claim 1, wherein the cavity is cross shaped, each two adjacent flanges cooperatively define a receiving channel, the four receiving channels communicates with each other and cooperatively define the cross-shaped cavity.

7. The positioning device of claim 1, wherein each of the flanges defines a threaded hole, each of the bearing assemblies comprises a screw bar, the screw bar comprises a first end and a second end away from the first end, the screw bar engages with the threaded hole, and the second end abuts against a corresponding branch member of the runner system.

8. The positioning device of claim 7, wherein each of the bearing assemblies is a bolt and comprises a screw cap, the first end is fixedly connected to the screw cap.

9. The positioning device of claim 7, wherein a length of the screw bar is slightly longer than a length of the threaded hole.

10. The positioning device of claim 7, wherein an axis of the threaded hole is substantially perpendicular to a lengthwise direction of a corresponding receiving channel directly communicating with the threaded hole.

11. The positioning device of claim 1, wherein each of the flanges comprises a top surface and two internal sidewalls, each internal sidewall of one of the flanges faces with another neighboring flange, each of the flanges defines two sloped surfaces, each sloped surface extends from the top surface to a corresponding internal sidewall to enlarge an opening formed by two adjacent flanges.

12. The positioning device of claim 11, wherein the sloped surfaces form an angle with the corresponding top surface.

13. The positioning device of claim 12, wherein the angle is about 30 degrees.

\* \* \* \* \*